B. H. MERSCH.
DEMOUNTABLE RIM BREAKER.
APPLICATION FILED JAN. 28, 1918.
1,350,418.
Patented Aug. 24, 1920.
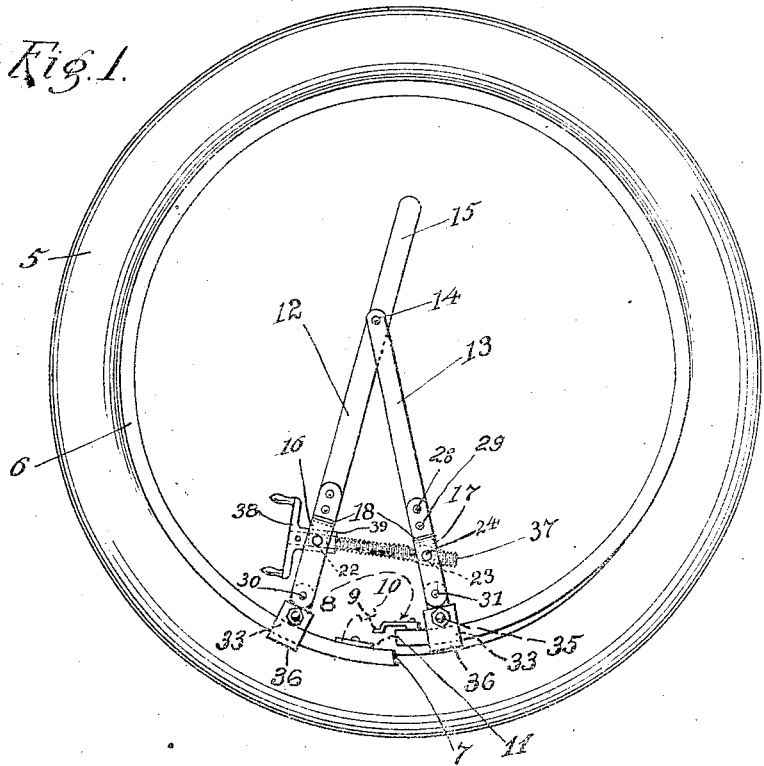
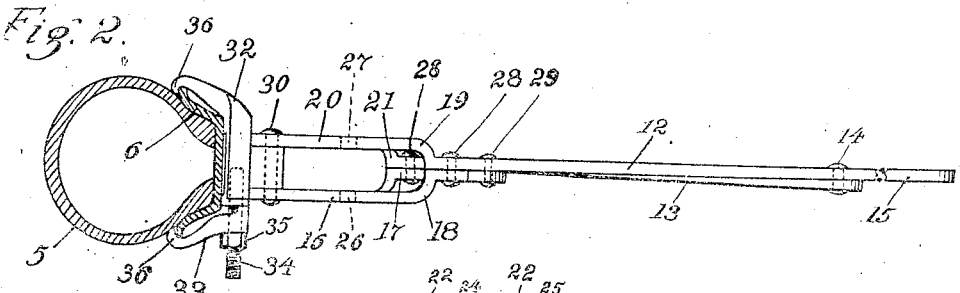
Inventor:
Bernard Henry Mersch,
By John Elias Jones,
Attorney.

UNITED STATES PATENT OFFICE.

BERNARD HENRY MERSCH, OF COVINGTON, KENTUCKY.

DEMOUNTABLE-RIM BREAKER.

1,350,418.  Specification of Letters Patent.  Patented Aug. 24, 1920.

Application filed January 28, 1918. Serial No. 214,181.

*To all whom it may concern:*

Be it known that I, BERNARD HENRY MERSCH, a citizen of the United States of America, and a resident of Covington, in the county of Kenton and State of Kentucky, have invented a certain new and useful Improvement in Demountable-Rim Breakers, of which the following is a specification.

This invention relates to demountable-rim breakers or tire-tools for use in contracting and expanding the rims of resilient tires of automobiles and other vehicle wheels, and the object of the invention is to provide a simple and effective implement whereby the transversely-split portion of the demountable rim can be readily upset or thrown out of abutting alinement for the removal of the resilient tire and just as readily reset or thrown into abutting alinement after the repairs have been made, especially when the vehicle is caught out on the highway where it is inconvenient to make repairs or to replace a tire.

The details of structure and the *modus operandi* of the invention herein will be fully described in connection with the accompanying sheet of drawings and then more particularly set out in the claim that follows.

In the said accompanying drawings:—

Figure 1 is an elevation of a resilient tire showing in connection therewith an upset, demountable, transversely-split rim and my improved tool or implement in applied position, ready for the removal of said tire; Fig. 2, an elevation of the said tool or implement showing its clamped relation with the demountable rim and with a resilient tire in place, but with the hand-screw used for holding the rim in demounted or upset position omitted; Fig. 3, an end view of one of the swivel-eyes used in the forked ends of the demounting levers; and Fig. 4, a longitudinal elevation of the said swivel-eye shown in Fig. 3.

5 indicates an ordinary resilient tire for automobile and other vehicle use, and 6, a demountable rim for same, such rim having the ordinary transversely-split or butt-joint portion 7 made in its circumference whereby the butt-joint can be upset or otherwise thrown out of alinement and the ends of the joint contracted or passed one back of the other by means of a suitable implement for readily removing said resilient tire when desired and then said implement reversed in operation to expand the rim and force its ends into abutting alinement or engagement to reëstablish said butt-joint.

A projecting bolt-member 8 is provided at one end of the rim and it has a shouldered outer end 9, a slotted slidable-member 10 being provided on the other end of the rim so that its fore end 11 may be easily brought into locking-engagement with the said shouldered end 9 of the bolt-member 8 when the two ends of the rim are in alinement and make a fully-closed butt-joint on the resilient tire when the latter is in normal using position.

The tool or implement used by me and forming the essential subject-matter of my invention herein is composed primarily of a pair of levers 12 and 13, the former (12) being the main or longer, rocking one, and the latter (13) the auxiliary or shorter, draft and push one of the pair, respectively.

These levers 12 and 13 are pivotally connected together at 14, a suitable distance inwardly from the grasping or handle end 15 of the main-lever 12, as best shown in Fig. 1, and a corresponding pair of plates or bars 16 and 17 is used at the inner ends of the levers 12 and 13, such plates 16 and 17 being each angled at 18 to conform to angles 19 made to aline therewith in the two levers 12 and 13 whose inner extended ends 20 and 21, respectively, are continued parallel and suitably spaced from said bars 16 and 17 and together forming forks between which are placed a smooth-bored eye or nut 22 and a diametrically threaded eye or nut 23, each eye 22 and 23 having laterally-extended trunnions 24 and 25 on which it is adapted to swivel in holes 26 and 27 made in said bars 16 and 17 and the extended parts 20 and 21 of the two levers.

The plates or bars 16 and 17 are secured by means of rivets 28 and 29, and the forks, at their extreme inner ends pivotally carry, on transverse rivets or bolts 30 and 31, a pair of corresponding clamps that are each made up of main jaw-members 32 and auxiliary detachable jaw-members 33, the latter (33) being secured in place by means of screws 34 whose outer ends are provided with jam-nuts 35 and whereby suitable adjustment or allowance may be made to suit various widths of rims. The outer ends of the jaw-members 32 and 33 are provided with claws 36 for firm and positive engagement (hook-fashion) over the edges of the rim when the implement is put in position for demounting use. The jam-nuts 35 are turned to and from place when applying and releasing the demounting-implement.

The inner pivotal end of the main-lever 12 forms the fulcrum of the implement in use and the pivotal clamp-connection of the short lever 13 forms the drawing end of the device in upsetting or contracting the rim when the said implement is in use. The pivotal-connection 14 of the auxiliary-lever 13 with the main-lever 12 compensates for the pull on the grasping or handle end 15 of the implement in upsetting or contracting inwardly the butt-joint or split portion of the rim and likewise when the said butt-joint is to be restored or expanded on the resilient tire.

To hold the demountable rim in upset or contracted position, when repairs to the resilient tire are to be made, or a tire replaced, I provide a hand-screw 37 that engages the threaded opening in the swivel-eye 23 of the auxiliary draft-lever 13, a detachable double-ended handle 38 being provided at the outer end of the screw for use in turning it in either direction for drawing the lever 13 toward the lever 12 or forcing it in the opposite direction therefrom, and a collar 39 being used on the said screw, too, for holding the screw free to turn in the swivel 22 of lever 12.

I claim:—

A hand implement for use in upsetting and resetting demountable rims for resilient wheel tires comprising a long main rock-lever having a forked inner end, a short pull or draft lever pivotally connected to the said long main rock-lever at a point substantially near the upper or outer handle end of the latter and having a forked inner end, an orificed swivel mounted in the fork of the long main rock-lever, a swivel having a threaded orifice and mounted in the fork of the short draft-lever, a hand-screw adapted to freely engage the plain-orificed swivel in the fork of the long main rock-lever and to have threaded-engagement with said threaded orifice of the last-named swivel, a pair of two-part claws pivotally attached to each of the said forked ends of the said respective adjustably-connected long main rock-lever and short draft-lever and adapted for readily detachable and adjustable hooking-engagement with the opposite circumferential edges of the said demountable rim, to straddle the transversely-split portion or joint therein, for easy separation and closing, as set forth.

BERNARD HENRY MERSCH.